United States Patent [19]
Roche

[11] Patent Number: 4,898,377
[45] Date of Patent: Feb. 6, 1990

[54] ROUNDABOUT WITH CLIMBING EFFECT FITTED WITH AN AIRPLANE

[76] Inventor: Jean J. Roche, 32, rue St Denis de Castines, 53500 Ernee, France

[21] Appl. No.: 270,915

[22] Filed: Nov. 14, 1988

[30] Foreign Application Priority Data

Nov. 12, 1987 [FR] France ................................ 87 15819

[51] Int. Cl.⁴ .......................... A63G 4/00; A63G 1/30
[52] U.S. Cl. .................................. 272/36; 272/33 R; 272/57
[58] Field of Search ..................... 272/33 R, 28 R, 36, 272/51

[56] References Cited

U.S. PATENT DOCUMENTS

| | | | |
|---|---|---|---|
| 1,896,175 | 2/1933 | Huffman | 272/36 X |
| 2,282,763 | 5/1942 | Kennedy | 272/36 |
| 2,294,166 | 8/1942 | Eyerly | 272/51 |
| 2,357,481 | 9/1944 | Mallon . | |
| 2,547,152 | 4/1951 | Burg | 272/51 |

FOREIGN PATENT DOCUMENTS

| | | | |
|---|---|---|---|
| 2921447 | 11/1980 | Fed. Rep. of Germany | 272/36 |
| 3541452 | 5/1987 | Fed. Rep. of Germany | 272/28 R |
| 479545 | 3/1953 | Italy | 272/36 |
| 127820 | 6/1919 | United Kingdom . | |
| 569219 | 5/1945 | United Kingdom | 272/36 |

*Primary Examiner*—Richard E. Chilcot, Jr.
*Attorney, Agent, or Firm*—Pollock, Vande Sande & Priddy

[57] ABSTRACT

A roundabout with climbing effect, of the type comprising an airplane designed for a pilot's training and/or recreation, has a pole which is movable in rotation on a vertical axis so as to describe a circular motion on this axis, and is also movable on a horizontal axis so as to enable a variation in altitude of the airplane in the course of its circular motion. A counterweight is provided at the end of the pole opposite the airplane, on the other side of the vertical axis. The airplane is fixed to the pole by a gripping device which cooperates with a circular ring surrounding the fuselage, and which supports the ring and the airplane at the end of the pole while, at the same time, enabling them to rotate freely on the longitudinal axis of the plane, thus enabling the pilot to perform rolls.

14 Claims, 4 Drawing Sheets

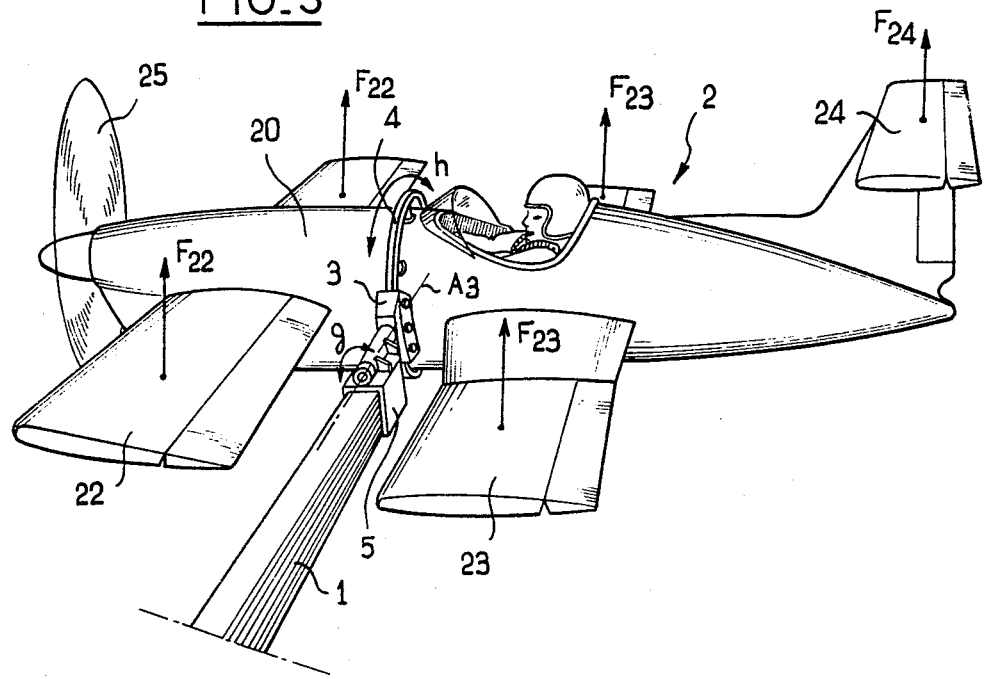
FIG_3
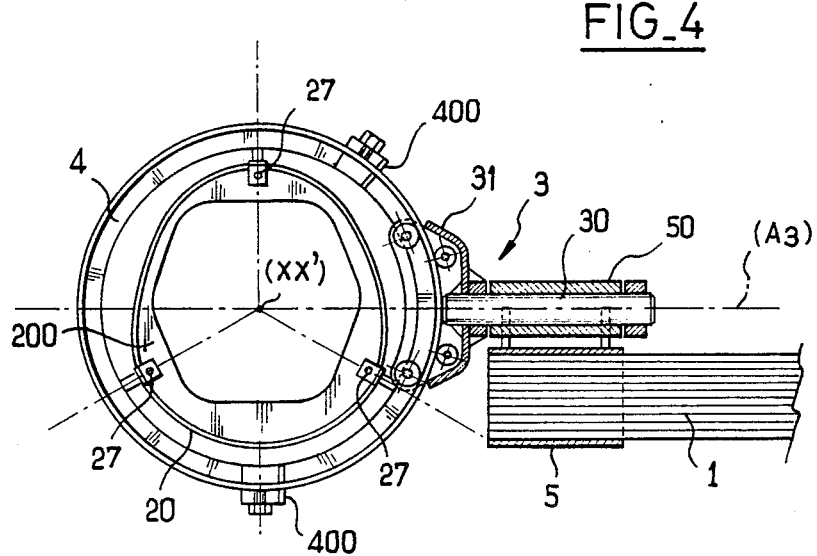
FIG_4

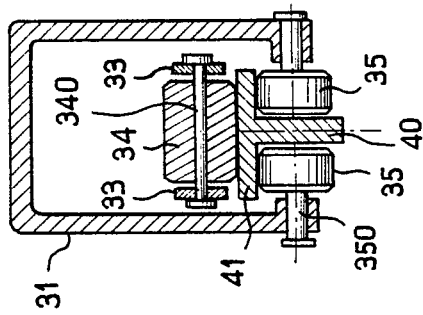
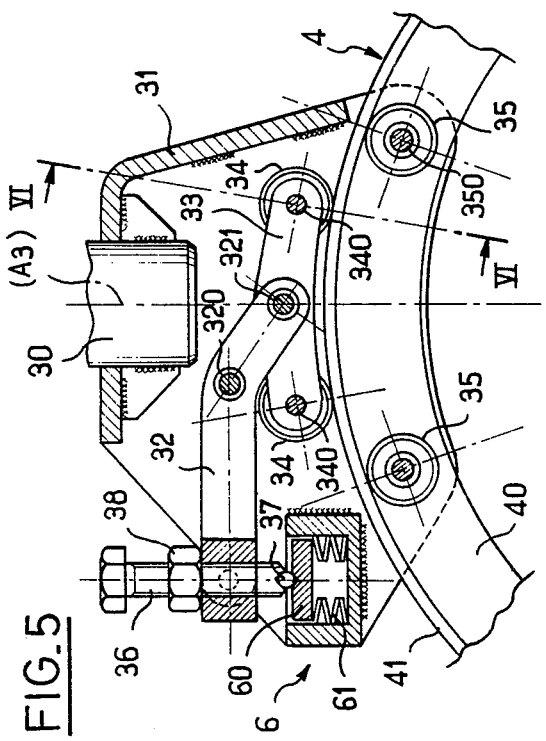
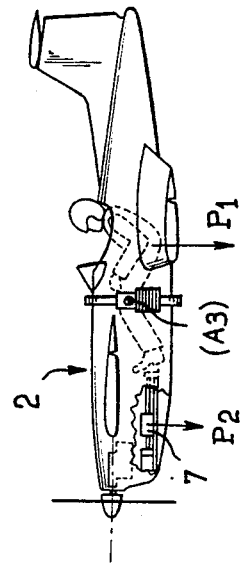

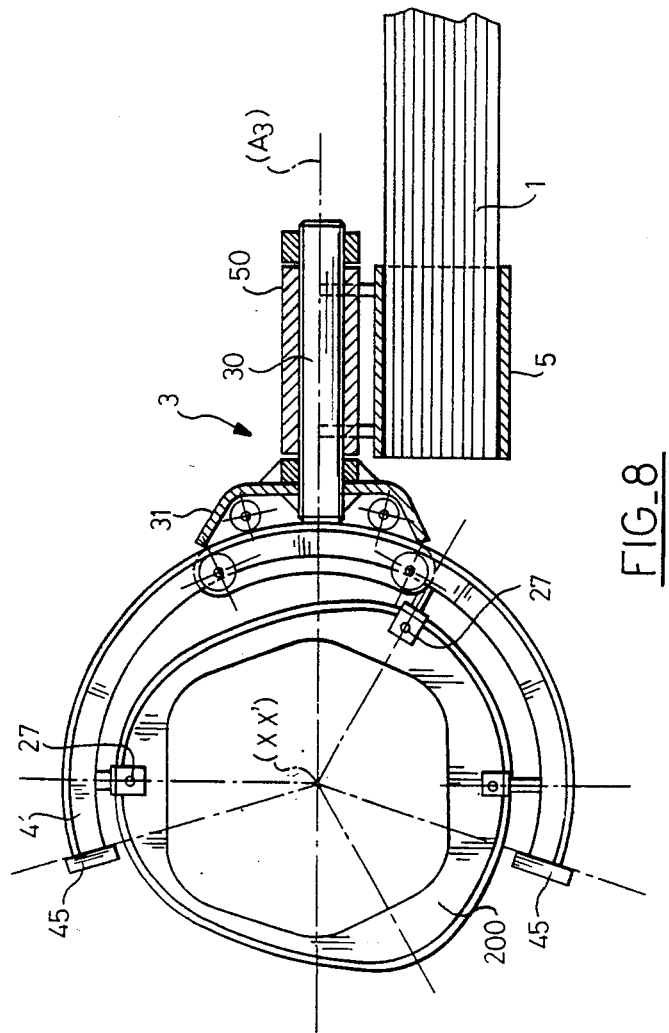
FIG_8

ROUNDABOUT WITH CLIMBING EFFECT FITTED WITH AN AIRPLANE

BACKGROUND OF THE INVENTION

1. Field of the Invention

The present invention concerns a roundabout with a climbing effect and, more precisely, a roundabout of the type having an airplane designed for pilot training and/or recreation.

2. Description of the Prior Art

A roundabout with climbing effect, designed essentially for recreational or sports activities, has already been proposed. This roundabout has a movable pole rotating on a vertical axis, at the end of which is mounted an element comprising a wing unit, for example a flying wing of the delta wing type which supports a user. A counterweight is provided at the end of the pole opposite to the mounted element, on the other side of the vertical axis. This counterweight is designed to substantially balance the weight of the craft and of the user. The mounting is, moreover, hinged on an axis which substantially corresponds to the longitudinal axis of the pole. Through his own muscular force (while he is running), the user can make the roundabout turn and then, in causing the angle of incidence of the wing to vary, he can rise with it.

Devices working according to a similar principle, designed to test an airplane and/or to train a pilot, have also been proposed. In these devices, it is a motor driven airplane (with propeller) that is mounted at the end of a rotating and oscillating arm, balanced by a counterweight.

Devices of this type have been described, particularly in FR-A-747 424 and WO-87/00 141.

In these prior art roundabouts, the connection of the airplane with the arm, which is located substantially at the center of gravity of the airplane, is such that the plane can manoeuver freely any direction, i.e., it can perform pitch, roll and yaw motions, and can do so in achieving conditions as close as possible to real flight conditions. However, the connection necessarily limits the amplitude of most of the motions and, in particular, that of the pitch and roll motions, so that it is clearly impossible for the pilot to perform aerobatic maneuvers such as rolls and loops.

An object of the invention is to overcome this deficiency by proposing a roundabout of the type referred to, wherein the airplane can achieve aerobatic manoeuvers, said roundabout being nonetheless simple, sturdy, reliabe, and relatively low priced.

SUMMARY OF THE INVENTION

These various results are achieved, according to the invention, through the fact that the airplane is fixed to the pole by means of a gripping device, adapted to hold a circular ring which is rigidly joined with the aircraft and surrounds the fuselage, said ring being contained in a plane, perpendicular to the longitudinal axis of the aircraft and centered on this axis, the gripping device supporting the ring and the airplane at the end of the pole while, at the same time, allowing them to rotate freely on said longitudinal axis.

In the present claim, the term "ring" designates not only a full circular ring (enabling complete roll manoeuvers, but also an incomplete or partial ring (shaped like an arc of a circle), enabling only rotations of limited amplitude on the roll axis.

The center of gravity of the assembly, formed by the airplane and the pilot, will be advantageously located substantially in the plane containing the ring.

Furthermore, according to a certain number of advantageous characteristics:

the ring has a T-shaped section;

the contact between the gripping device and the ring is achieved by means of rollers;

there is provision for two sets of rollers, located on either side of the upper arm of the "T" section of the ring, the set located beneath said upper arm comprising rollers placed on either side of the vertical arm of this section;

one of the sets of rollers is borne by a movable brace, acted upon by an elastic system which applies these rollers elastically against the ring.

Furthermore, the gripping device is preferably hinged on an axis which substantially corresponds to the longitudinal axis of the pole or is close to it. It thus becomes possible for the pilot to perform not only rolls but also loops as well as, naturally, combined manoeuvers associating rolls and loops.

In an especially advantageous embodiment of the invention, the airplane is of the biplane type, wherein the two planes are located on either side of the longitudinal axis of the pole, one in front of this axis and the other behind it, in such a way, that during the circular motion of the roundabout, they generate two substantially equal and opposite lifting moments, thus making it possible to prevent any untimely pitching effect and to improve the stability of the flight.

In this case, the two planes (the front and rear planes) are preferably offset heightwise, so that the flow of air on the front plane does not disturb to any great extent the flow of air on the rear plane.

Inside the airplane, there may be provision for a mobile counterweight which can be shifted in the longitudinal direction of the airplane, in one direction or the other, so as to enable static balancing of the airplane (depending on the pilot's weight) with respect to the longitudinal axis of the pole.

The airplane can be driven, as in known devices, by a propeller driven by a motor, for example an electrical motor housed in the airplane.

BRIEF DESCRIPTION OF THE DRAWINGS

Other features and advantages of the invention will appear from the following detailed description, made with reference to the appended drawings, which show a preferred embodiment of this invention.

FIG. 3 is a side view in perspective of this same airplane;

FIG. 4 is a cross-sectional view of the airplane, schematically showing the mode by which the airplane is fixed to the end of the pole;

FIG. 5 shows a more precise detail of the gripping device and of a part of the ring;

FIG. 6 is a side view along line VI—VI of FIG. 5;

FIG. 7 is a side view of the plane designed to show the static balancing system of the plane on the axis of the pole.

DESCRIPTION OF A PREFERRED EMBODIMENT

Figures 1, 2:
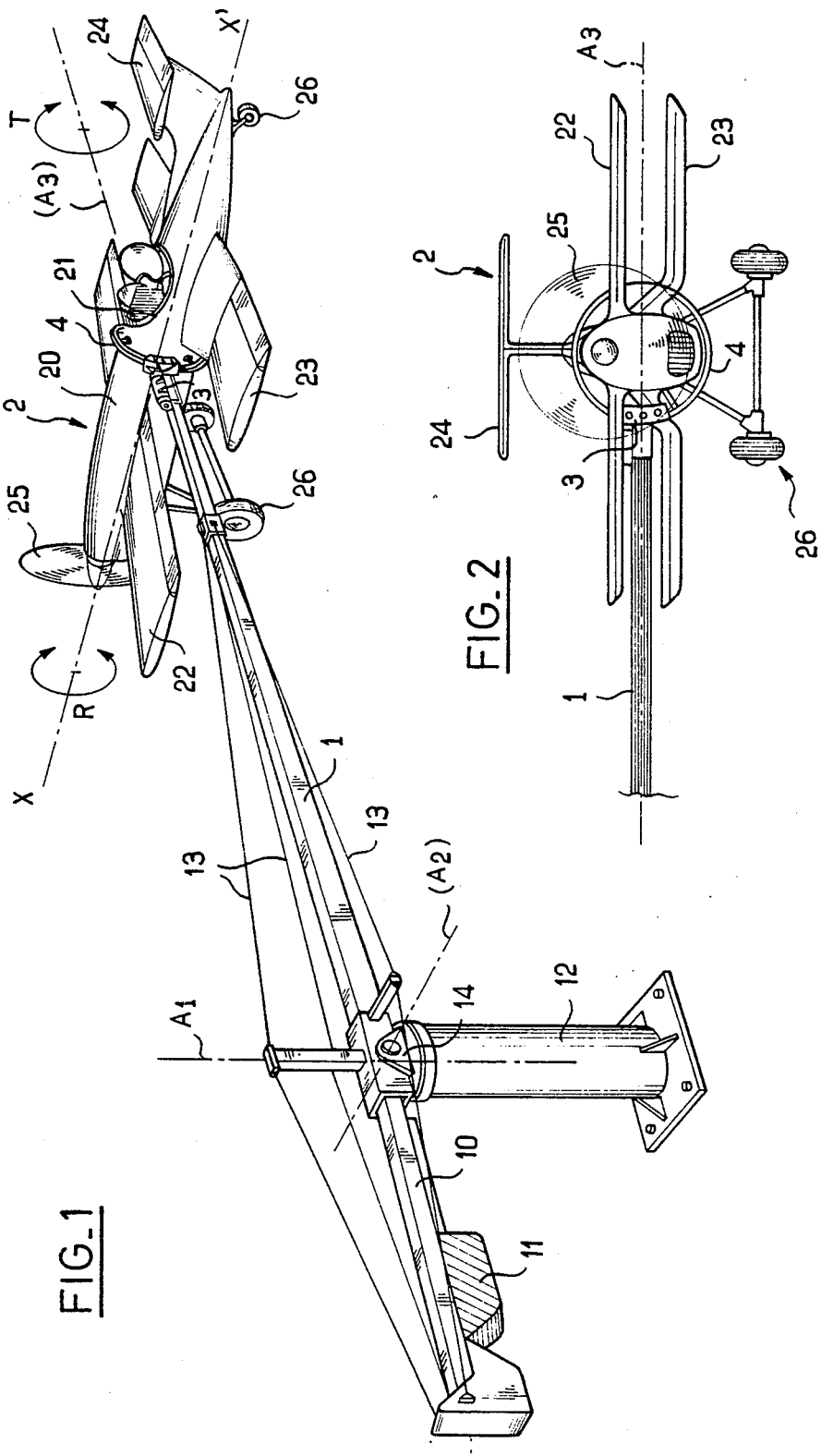
FIG. 1 is a perspective view of the entire roundabout.
FIG. 2 is a front view of the airplane fixed to the end of the pole.

The roundabout with climbing effect, shown in FIG. 1, has a fixed bearing support 12 with a vertical axis (A1) in which support a cover 14 is hinged. This cover 14 supports an arm or pole 1 which can pivot on a horizontal axis (A2).

At one of its ends, the pole 1 supports an airplane 2, such as a small, light, single-seater airplane. On the other side of the axis (A1), the pole 1 is extended by a shorter part 10, fitted with a counterweight 11. This counterweight 11 can advantageously move along the part 10, thus making it possible to adjust the moment that it exerts with respect to the axis (A2) in order to compensate for the weight of the airplane 2 and its pilot.

Bracing wires 13 are provided to heighten the resistance of the pole to deflection.

The airplane 2 is a biplane. It is provided, at its front part, with a pair of wings 22 and, at its rear part, with a pair of wings 23. These two planes, 22, 23, are offset heightwise, as can be seen more particularly in FIG. 2; the front plane is at a higher level than the rear plane.

The aircraft 2 also has a fuselage 20, a propeller 25, driven by a suitable motor, for example an electrical motor (not shown) housed in the front part of the fuselage, and a rear aileron or stabilizer 24.

The longitudinal axis X-X' of the airplane corresponding to the roll axis (double arrow R). The pitch axis (double arrow T) is marked A3.

The airplane is also fitted with a landing gear 26, enabling it to taxi on the ground before take-off and after landing.

The pilot's cockpit is located, for example, vertically to the front zone of the rear plane 23 (see FIGS. 3 and 7 in particular).

At the end of the pole 1, there is fixed a device 3 to hold the airplane. This device consists of a gripping device that works with a ring, namely a ring 4, which is centered on the axis (X-X').

This ring 4 is a metallic structure with a "T" shaped section, which completely surrounds the fuselage 20, slightly in front of the cockpit 21. The longitudinal position of the ring 4 is defined in such a way that the center of gravity of the airplane/pilot unit is located substantially in the vertical plane of this ring.

The ring 4 is solidly fixed to the structure of the airplane, in this case to the transverse couple 200 located in this zone, the fixing being done by appropriate known means, such as bolts 27.

The gripping device 3 is fixed to the end of the pole 1 by means of an metallic mounting piece 5 supporting a bearing 50, the axis (A3) of which is parallel to the longitudinal direction of the pole 1. The offset between the axis (A3) and the longitudinal axis of the pole is equal to a few centimeters only, which is little compared with the dimensions of the roundabout. In fact, the axis (A3) thus substantially corresponds to the longitudinal axis of the pole. The gripping device 3 has a shaft 30 which is guided in rotation and kept still in translation in the bearing 50, so much so that the entire gripping device can rotate on the axis (A3).

This gripping device 3 has a metallic armoring 31 with the general shape of a cap, the side cheeks of which are positioned on either side of the ring 4, as can be seen more particularly in FIG. 6.

Each of these side cheeks is provided with a pair of rollers 35, the axes 350 of which are guided in rotation and held still in translation in the armoring 31. There is therefore provision for two pairs of rollers 35, and each of these pairs is located on either side of the vertical arm 40 of the "T" section of the ring 4, with all these rollers being applied against the lower face of the upper cross bar 41 of this "T".

On the other side of the arm 41, there is placed a pair of rollers 34, supported by the shafts 340 and borne by a movable strap 33. This movable strap is mounted, by means of a hinging shaft 321, at the end of a lever 32, which is itself hinged on a shaft 320 in the armoring 31.

An elastic system 6 acts on the lever 32 so as to press the two rollers 34 forcefully and elastically against the external surface of the ring 4.

The elastic system 6 has, for example, a set of springs 61 of the Belleville spring washer type, placed in a housing provided for this purpose in the armouring 31, and acting on a piston 60 which itself acts on the lever 32 by means of a ball 37 housed at the end of screw 36 borne by the lever 32.

By screwing the screw 36 lesser greater or to a extent into the lever 32, it is possible to adjust the contact pressure of the rollers 34 against the ring 4. A bolt 38 prevents any untimely unscrewing.

It will, therefore, be understood that the gripping device 3 enables the ring 4 to be held along with the entire airplane at the end of the pole 1, while at the same time permitting circumferential motions of the ring between the two sets of rollers 34 and 35. Naturally, the presence of these rollers is designed to enable the ring to roll in the gripping device, thus considerably reducing friction.

The presence of the rollers 35 on either side of the core 40 prevents the ring from escaping laterally. It would further be possible to provide for additional rollers, arranged orthogonally with respect to the rollers 34, 35, and adapted to clamp the core 40 in being applied to either side of it.

As already stated, the airplane (and correlatively the entire roundabout) is propelled by a propeller 25 driven by a motor. This motor is advantageously connected to a speed amplifying or speed reducing mechanism, and the pilot has a system to adjust the rotational speed of the propeller.

If an electrical motor is used, the electrical supply of this motor will be accomplished from the outside through two sets of rotating, current-conducting rings, working together with carbon brushes. One of these sets will be placed at the level of the cap 14 rotating on a horizontal axis, and the other at the circular ring 4. These means for the transmission of electrical power between a fixed element and a rotating part are well known and have not been omitted from the drawings for the sake of clarity.

As in a conventional airplane, the pilot has a joystick type of piloting device at his disposal. Manoeuvering this joystick device enables him to act, through an appropriate rod assembly, on the various rudders provided on the wing unit. He can thus perform climbing and descending movements (by pivoting on the axis A3) and roll movements (by pivoting on the axis X-X'). On the contrary, there is no provision in this roundabout for any possibility of yaw movements.

As can be seen in FIG. 7, counterweight 7 is provided inside the airplane. This counterweight can be shifted in translation along the longitudinal axis of the airplane. A device to shift this counterweight, motor-driven for example, enables the pilot to balance the airplane/pilot unit on the axis (A3). If it is assumed that the airplane alone is already statically balanced with reference to this axis, it will naturally suffice to shift the mass 7 so that the moment of its weight (P2) is equal and opposite to the moment of the pilot's weight (P1) with respect to this axis. Preferably, the pilot will have, within reach, the control mechanism to shift this counterweight 7.

The method for using this roundabout will now be described.

With the counterweight 7 positioned so that the airplane is statically balanced on the axis (A3), taking into account the pilot's weight, and with the counterweight 11 having been placed in a correct position, enabling take-off as desired, the pilot starts up the driving motor for the propeller 25. The aircraft starts taxiing along a circular trajectory, being propelled by the rotation of the propeller. Then the pilot acts on the joystick to activate the rudders and cause the airplane to take off. The airplane rises while the pole 1 pivots on the axis (A2). This movement is naturally made easier by the counterweight 11. Due to the invention, the pilot can not only make limited pitch and roll movements on the axes (X-X') and (A3) respectively, but can also perform aerobatic manoeuvers around these axes.

These manoeuvers are made possible because the ring 4 can be shifted in the gripping device (double arrow h, FIG. 3), and the hinging of the gripping device 3 in the bearing 50 (double arrow g).

It is clear that any combination of these two rotational movements is possible: the airplane could perform, for example, a roll manoeuvers while climbing or diving, or a rolling loop or, again, manoeuvers involving vertical wings or inverted flight or any other intermediate position.

A major characteristic of the invention lies in the fact that the airplane has two planes 22, 23, offset with respect to the axis (A3). The value of these two planes is that, during the rotational movement of the pole 2, they provide two symmetrical lifting forces ($F_{22}$ and $F_{23}$) with respect to the axis (A3), so that any untimely pitching motion is avoided: for the relatively low speeds at which the roundabout works, the stabilizer 24 located at the tip of the rear aileron generates a lifting force ($F_{24}$) which is appreciably inadequate to provide this stabilizing function.

The two planes 22 and 23 are offset in such a way that the flow of air on the front plane does not disturb the flow of air on the rear plane, and does so so as to retain all its efficiency. These two planes do not necessarily have the same dimensions or the same area.

It can be seen clearly from the above explanations that the invention makes it possible to considerably increase the manoeuvering possibilities of this type of roundabout. This is very valuable, not only for sports and recreation but also for training pilots in aerobatics with complete safety.

There may be provision for placing stop devices on the ring 4 so as to enable limiting the amplitude of the roll if desired. Stop devices of this kind are shown in FIG. 4 under the reference 400. They are fixed to the ring, preferably in a detachable way (for example with screws), so that when there are no stop devices, the airplane can perform full rotations of 360° to perform rolls. Similarly, stop devices can be provided to limit the see-saw motion of the plane on the axis (A3), namely, the pitch motion.

The circular ring 4 is replaced by an incomplete ring portion forming an arc of a circle (for example, a half circle) centered on the axis X-X'. A construction of this type, which would not enable complete roll manoeuvers but only limited rolling motions, would be designed, for example, for beginner pilots. In this case, it would be naturally necessary to provide for stop devices (preferably shock absorbers) at both ends of the ring portion preventing the ring from being separated from the gripping device at the end of the travel.

The invention can be applied to other types of airplane than the one shown, particularly an airplane with several seats.

What is claimed is:

1. A roundabout with climbing effect, of the type comprising an airplane mounted at one end of a pole which is movable in rotation about a vertical axis so as to describe a circular motion on said axis, said pole being also movable on a horizontal axis so as to enable a variation in altitude of the airplane during its circular motion, a counterweight being provided at the other end of the pole, opposite to the airplane with regard to the vertical axis, said counterweight substantially balancing the weight of the airplane and the pilot's weight, wherein the airplane is fixed to the pole by means of a gripping device which is adapted to hold a ring which is solidly joined to the airplane and surrounds a fuselage of said airplane, said ring being contained in a plane perpendicular to a longitudinal axis of the airplane and being centered on it, the gripping device supporting the ring and the plane at the end of the pole while at the same time enabling their free rotation on said longitudinal axis, wherein the center of gravity of the unit formed by the airplane and the pilot is located substantially in the plane containing the ring and, further, wherein the airplane is a biplane having two planes located on either side of the longitudinal axis of the pole, one in front of said pole and the other behind said pole, such that, during the circular motion of the roundabout, they generate two substantially equal and opposite lifting moments, thus preventing an untimely pitch effect.

2. A roundabout according to claim 1, wherein the ring has a "T" shaped section.

3. A roundabout according to claim 2, comprising two sets of rollers located on either side of the upper arm of the T shaped section of the ring, the set of rollers located beneath said upper arm comprising rollers placed on either side of the vertical arm of this section.

4. A roundabout according to claim 3, wherein one of the two sets of rollers is borne by a movable strap acted upon by an elastic system which applies them elastically against the ring.

5. A roundabout according to claim 1, wherein the contact of the gripping device with the ring is achieved by means of rollers.

6. A roundabout according to claim 1, wherein the griping device is hinged on an axis which substantially corresponds to the longitudinal axis of the pole.

7. A roundabout according to claim 1, wherein the two planes are offset heightwise so that the flow of air on the front plane does not disturb the flow of air on the rear plane.

8. A roundabout according to claim 1, comprising inside the airplane, a movable counterweight which can be moved along the longitudinal direction of the airplane so as to enable a static balancing of said airplane with respect to the longitudinal axis of the pole.

9. A roundabout according to claim 1, wherein the airplane is propelled by a motor-driven propeller.

10. A roundabout according to claim 9, wherein said motor is an electrical motor housed in said airplane.

11. A roundabout according to claim 1, wherein the ring is a complete circular ring allowing the airplane to rotate freely through 360° about its longitudinal axis, thus enabling the pilot to perform rolls.

12. A roundabout according to claim 1, wherein the ring is an incomplete ring in the form of an arc of a circle.

13. A roundabout according to claim 1, wherein the ring is provided with stops adapted to restrict the amplitude of rotation of the airplane on its longitudinal axis.

14. A roundabout according to claim 13, wherein said stops are removable.

* * * * *

UNITED STATES PATENT AND TRADEMARK OFFICE
CERTIFICATE OF CORRECTION

PATENT NO. : 4,898,377
DATED      : FEBRUARY 6, 1990
INVENTOR(S): ROCHE

It is certified that error appears in the above-identified patent and that said Letters Patent is hereby corrected as shown below:

```
Column 1, line 64, change "claim" to --claims--
Column 1, line 66, add a bracket after "manoeuvers"
Column 3, line  6, after (A1), insert a comma
Column 3, line 29, change "corresponding" to --corresponds--
Column 4, line 17, change "armouring" to --armoring--
Column 4, line 53, delete "not"
Column 4, line 64, before "counterweight" insert --a--
Column 5, line 23, after (A3), insert a comma
Column 5, line 67, change "is" to --may be--
```

Signed and Sealed this

Seventh Day of April, 1992

Attest:

HARRY F. MANBECK, JR.

*Attesting Officer*    *Commissioner of Patents and Trademarks*